Jan. 5, 1954 F. W. RIDDLE 2,664,920
FLOAT CUTTING METHOD FOR LOOMS
Filed Dec. 22, 1949 5 Sheets-Sheet 1
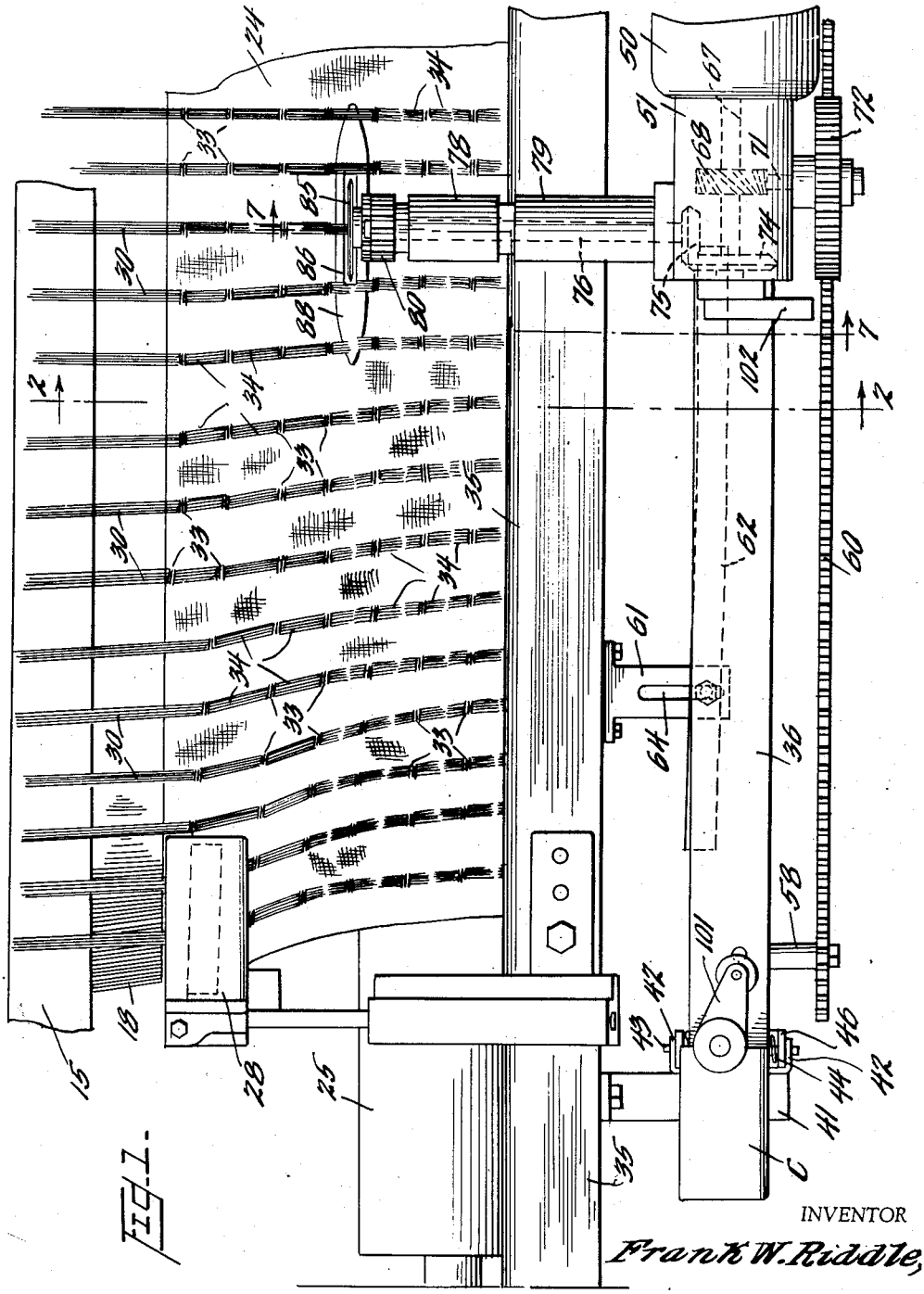
INVENTOR
Frank W. Riddle,
BY
Watson, Cole, Grindle & Watson
ATTORNEY

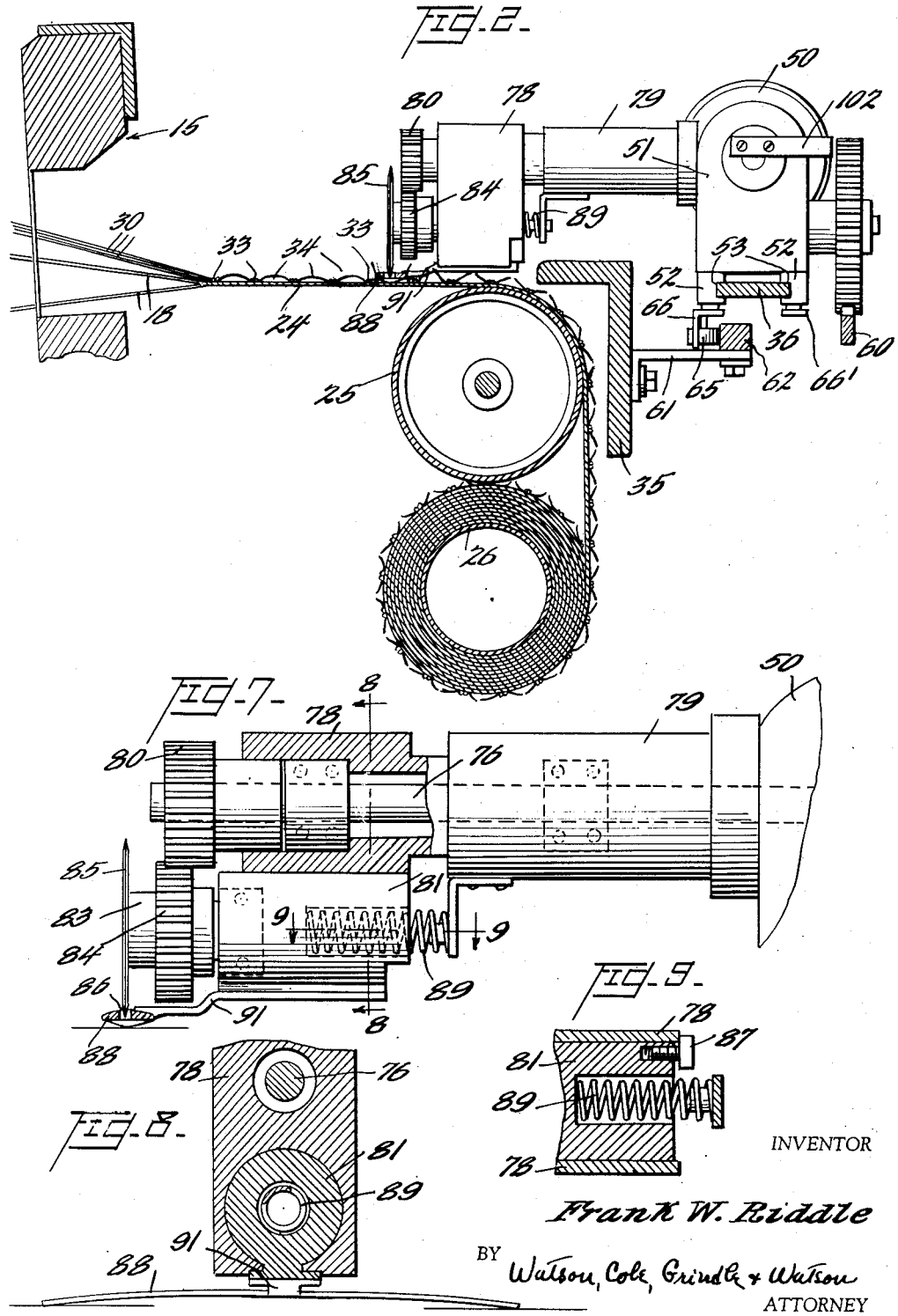

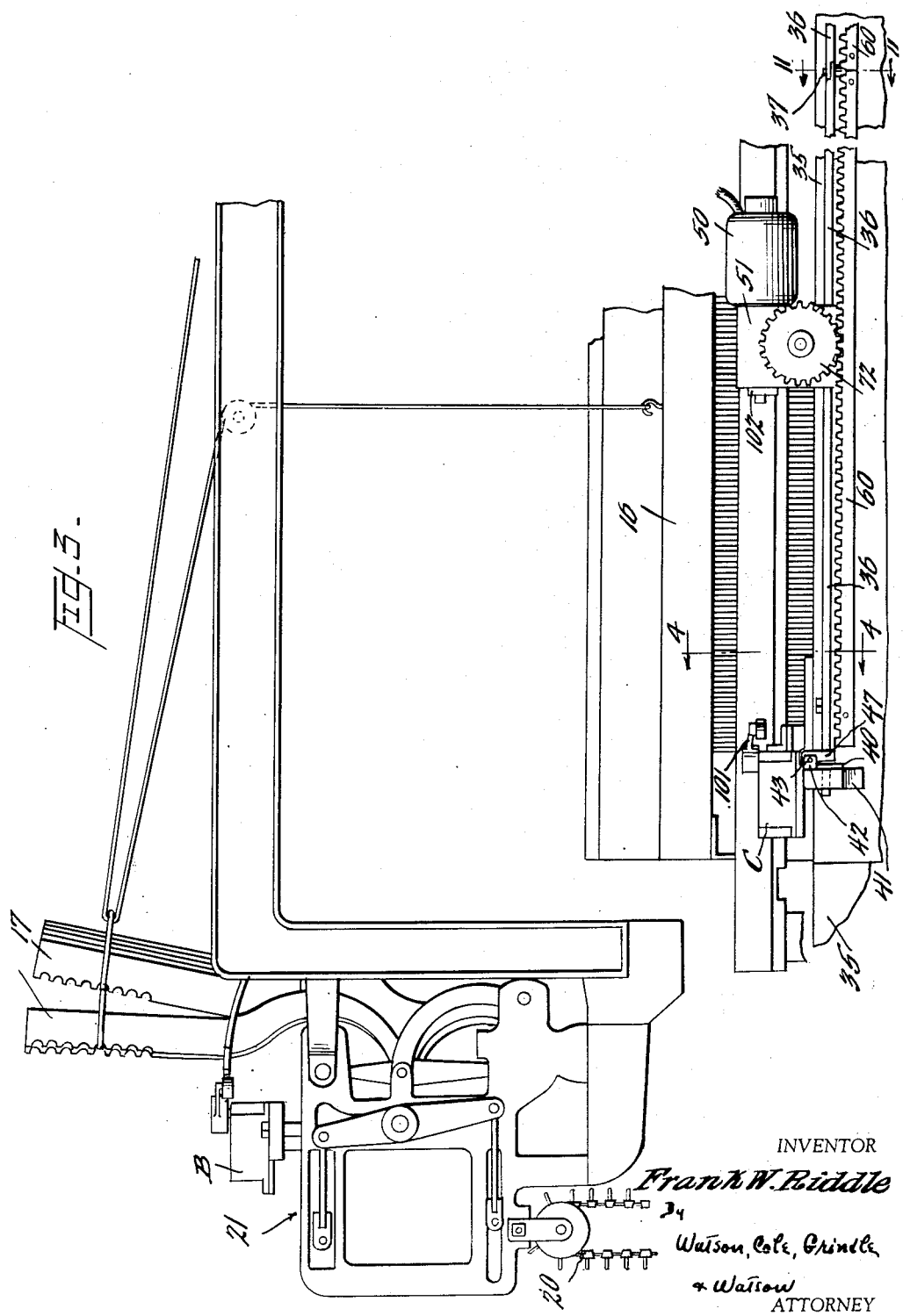

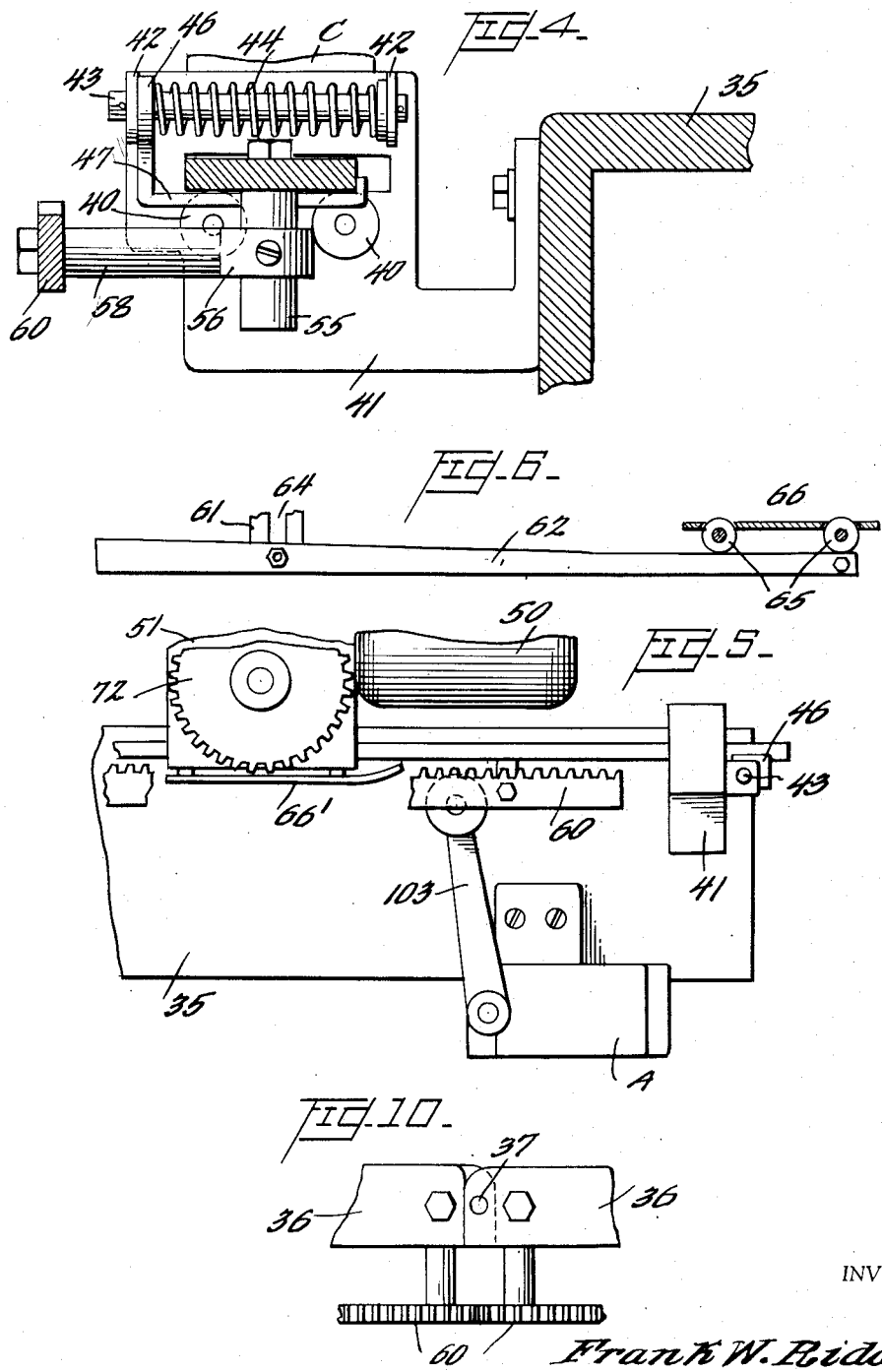

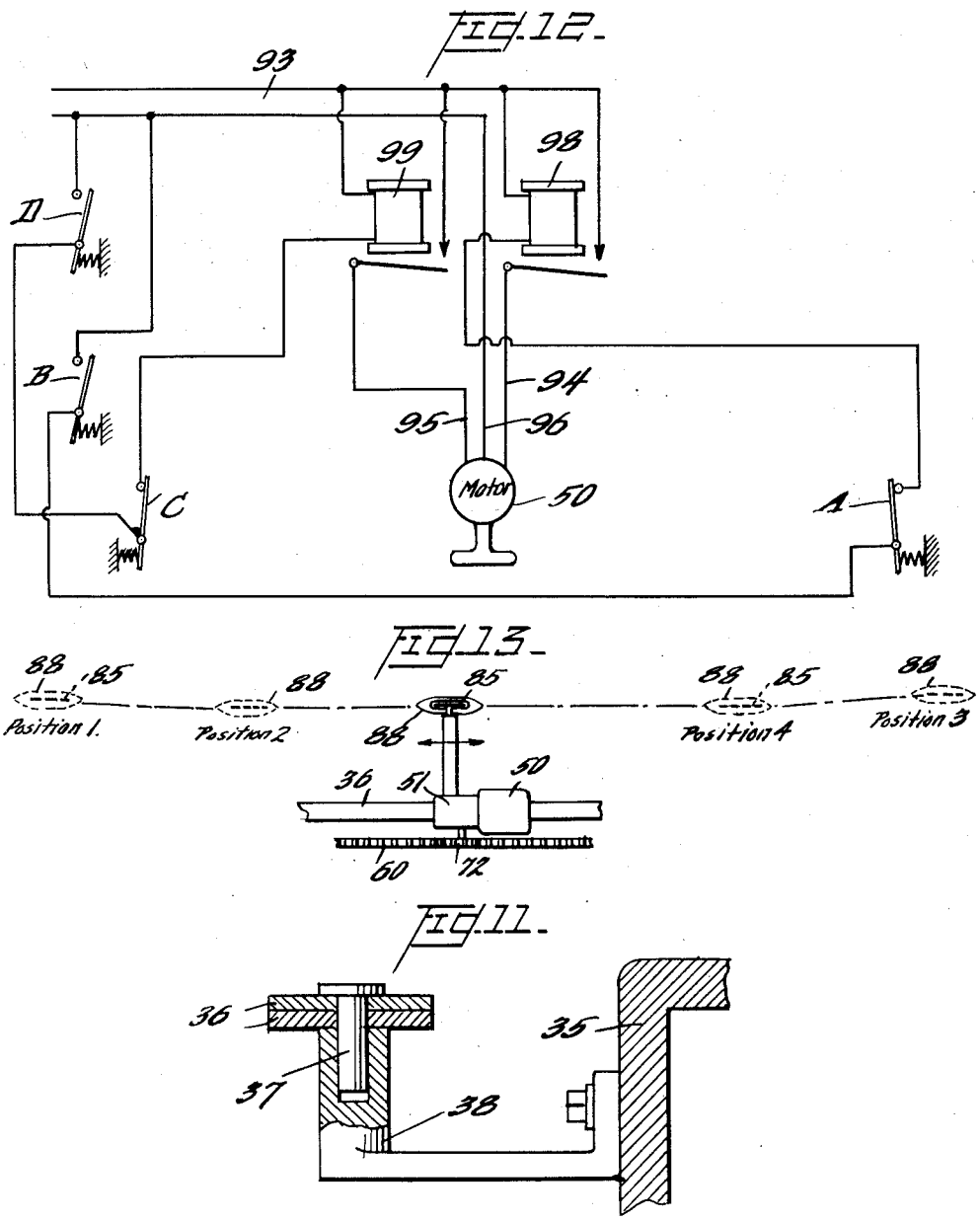

Patented Jan. 5, 1954

2,664,920

UNITED STATES PATENT OFFICE 2,664,920

FLOAT CUTTING METHOD FOR LOOMS

Frank William Riddle, Biscoe, N. C., assignor to Aileen Mills Company, Biscoe, N. C., a corporation of Delaware Application December 22, 1949, Serial No. 134,554

2 Claims. (Cl. 139—291)

This invention relates to improvements in apparatus and methods for making tufted fabrics, and more particularly to the severing of continuous tuft cords, employed in the manufacture of such fabrics, after weaving of the cords into the fabric.

It is a common expedient in the manufacture of fabrics of this character to feed continuous tuft cords, each comprising a bundle of threads, in parallel relation and in the direction of and above the warp threads of the fabric. By suitable manipulation of the loom harness, controlled by the feeding of an appropriate pattern to the loom dobby or the like, the tuft cords are depressed at intervals, together with selected warp threads, to provide a shed for the passage of the shuttle, whereby the cords are woven into the fabric at spaced points in the length thereof. Intermediate these points the cords are free, constituting loops, and the loops thus formed in the cords are disposed in rows, generally aligned transversely of the fabric. Tufts are then formed by severing the loops, thereby forming the tuft ends.

This is a conventional operation, commonly performed on ordinary power looms, the cutting of the tuft loops being effected manually by moving a cutting tool across the fabric to sever the aligned loops, one transverse row of loops being cut on each stroke of the tool. It is a feature of the instant invention that the cutting is effected automatically and in such a manner as to provide greater accuracy in the cutting and increased uniformity in the length of the tufts.

It is, therefore, an object of the invention to provide apparatus, either as a component of a loom, or as an attachment for or an adjunct to a loom, whereby tuft cords woven at intervals into a fabric so as to provide tuft loops, may be severed substantially midway of each loop, in combination with means whereby such apparatus is operated automatically and in timed relation to the lengthwise advance of the fabric.

More specifically, it is an object of the invention to provide, in a loom suitable for use in the manufacture of tufted fabrics, a cutting device reciprocable transversely of the fabric and in timed relation to the operation of the loom, to effect cutting of successive rows of aligned loops on each transverse stroke in either direction of the cutting device.

As the result of the action of the temples, which apply transverse tension to the woven fabric, the weft threads are usually curved rearwardly to some extent adjacent the selvage, and there is corresponding rearward displacement at each side of the fabric of the points at which the tuft cords are woven into the fabric. Thus the tuft loops are not precisely aligned in each transverse row, and cannot be severed by transverse motion of a cutting device in a straight line. In the preferred embodiment of the invention, therefore, means are provided to cause the cutting device to follow a slightly curved path adjacent each end of its travel so as to conform to the distortion of the fabric near the selvage. It is a further feature of the invention that undue strain on the fabric during the cutting operation is avoided by causing the cutting device to move inwardly of the selvage prior to the cutting stroke, to perform a short cutting stroke in which a limited number of tuft loops are severed while moving outwardly toward the selvage, and thereafter to perform the main cutting stroke, wherein the remainder of the tuft loops are severed, while moving across the entire width of the fabric to the opposite selvage.

Further features and objects of the invention will be apparent from the following description, taken in connection with the accompanying drawings, in which Figure 1 is a fragmentary plan view of part of a loom, illustrating one mode of practicing the invention;

Figure 2 is a vertical section taken on the line 2—2 of Figure 1;

Figure 3 is a front elevation of the loom shown in plan in Figure 1;

Figure 4 is a fragmentary sectional view on the line 4—4 of Figure 3;

Figure 5 is a front elevation of the detail appearing to the right of the structure shown in Figure 3;

Figure 6 is a plan view of certain elements shown in Figure 4;

Figure 7 is a sectional view taken substantially on the line 7—7 of Figure 1;

Figure 8 is a section on the line 8—8 of Figure 7;

Figure 9 is a section on the line 9—9 of Figure 7;

Figure 10 is a fragmentary detail view of structure shown in Figure 1;

Figure 11 is a section on the line 11—11 of Figure 3;

Figure 12 is a wiring diagram suitable for controlling the operation of the claimed apparatus; and Figure 13 is a diagrammatic view representing the preferred method of guiding and operating the cutting device.

In order to promote an understanding of the invention, a preferred embodiment thereof is illustrated in the drawings and specific language is used to describe the same. It will be understood, however, that further modifications and alterations of the illustrated structure are contemplated, such as would normally occur to one skilled in the art, and that the descriptive language is not to be construed as limiting the scope of the invention.

The invention is illustrated as applied to a conventional type of dobby loom, the details of which form no part of the instant invention, but may be varied widely. Thus the warp threads 18, carried on a beam at the rear of the loom, are fed forwardly through a reed 15, and are raised and lowered by harness 16 which is controlled by jacks 17, the latter being selectively rendered operable by a pattern chain 20, fed through a dobby 21. The cloth or fabric 24 is passed over a roughened roll 25 and wound on a cloth roll 26, temples 28 being provided at each side of the fabric to apply transverse tension to the latter in the known manner. A loom of generally similar type and mode of operation is shown in the patent to Cobb 1,383,076, in which the pattern chain is of the type in which pins are selectively inserted to control the operation of the jacks, and thereby the harness.

As hereinbefore indicated, the invention is concerned with the production of tufted fabrics which are formed by weaving into the fabric tuft cords or ropes, each comprising a considerable number of threads. The cords are woven into the fabric at spaced intervals, thereby forming tuft loops, which are severed, leaving the free ends or tufts. Thus as shown in Figures 1 and 2, tuft cords 30 are fed forwardly over and in the general direction of the warp threads 18. By lowering the tuft cords 30 at intervals, each cord is woven into the fabric at spaced points 33, forming a free loop 34 intermediate these points. Since all of the tuft cords are lowered and woven in at the same instants, adjacent loops are substantially aligned, although considerable distortion of the fabric, and resultant rearward displacement of the loops occurs adjacent the selvage, as the result of lateral tension applied to the fabric by temples 28. Thus in order to cut the tuft loops, a substantially straight cutting stroke may be taken across the fabric and over the major portion of the width of the fabric, but as the cutting tool approaches the selvage, it must be concurrently displaced rearwardly to compensate for the lack of alignment of the loops at either side of the fabric. The manufacture of tufted fabrics in this manner, the cutting of the tuft loops being performed manually, is a well known practice. In accordance with the instant invention, the severing of the tuft loops, formed in the usual way, is effected by automatic mechanism about to be described, embodying the inventive concept.

The automatic mechanism, which may be considered either as an attachment or an adjunct to a conventional loom, is located, with the exception of certain control switches, at the front of the loom and may be mounted on a structural part 35 of the loom frame, as shown in Figures 1 and 2. A pair of guide plates 36, extending transversely of the loom, and in substantial alignment, are pivoted together adjacent the center of the loom by a pin 37, the latter being received in bracket 38 secured to structural part 35 of the loom. As shown in more detail in Figures 10 and 11, the adjacent ends of guide plates 36 are dovetailed, part of one plate overlying part of the other at the point of passage therethrough of pin 37. At their remote ends, each plate is supported on rollers 40 carried on a bracket 41 secured to loom part 35. Bracket 41 is provided with upstanding ears, in which a pin 43 is mounted. A coil spring 44 surrounds pin 43 and bears at one end against a collar 46 slidably received on the pin 43. Depending from collar 46 is a yoke 47 extending beneath and embracing the guide plate 36. Thus on displacement of plate 36 to the right from the position in which it is shown in Figure 4, the plate rides on the rollers 40, and spring 44 is compressed by yoke 47 and collar 46, spring 44 tending to return the plate 36 to its initial position. In this manner, the remote end of each guide plate may be displaced toward the loom, independently of the other guide plate.

A drive unit comprising an electric motor 50 and a gear housing 51, rigid with and extending from one end of the motor, is mounted slidably on the aligned guide plates 36, for instance by guide brackets 52 depending from the gear housing 51 and grooved as at 53 to slidably engage the edge portions of guide plates 36.

Projecting from the underside of each plate 36 is a plurality of studs 55, and embracing each stud is a sleeve 56, adjustably secured to the stud and carrying an arm 58. A pair of toothed racks 60, one rack being supported in parallel relation with and adjacent to each guide plate 36, are disposed in substantial alignment and are mounted on the arms 58, so that the racks 60 are rigidly mounted on plates 36 and may partake of slight swinging movement with the plates.

At either side and at the front of the loom, and below the adjacent guide plate 36, is positioned a cam element 62. Each cam element is supported on brackets 61 secured to structural element 35 of the loom frame, the more remote of the brackets 61 being slotted as at 64 to permit adjustment of the adjacent end of the cam 62 toward and away from the frame. Depending from the brackets 52 on the gear housing 51 are plates 66 and 66¹, the former supporting a pair of rollers 65, which are arranged to engage the inner face of either cam 62 as the drive unit approaches either side of the loom. Each of the cams 62 is so shaped and positioned as to effect gradual displacement of the roller 65, and thereby the guide plate 36, and the motor and gear housing, toward the loom, the whole assembly swinging slightly about the axis of pin 37 as hereinbefore described.

Motor 50 is provided with a drive shaft 67 extending into gear housing 51. Mounted on shaft 67 is a spiral gear meshing with a mating gear 68 on shaft 71, the latter extending exteriorly of the gear housing and having a spur gear 72 secured thereon. Spur gear 72 is positioned to mesh with the toothed racks 60; consequently, energization of the motor serves to drive the motor, gear casing, and associated parts to and fro on the guide plate 36, the direction of movement being determined by the direction of rotation of the motor 50.

The motor shaft 67 also carries a bevel gear 74, which meshes with bevel gear 75, secured to a shaft 76, the latter projecting inwardly toward the loom within a bearing block 78 secured rigidly to the gear housing by a bracket 79 projecting from the housing. At its outer end the shaft 76 carries a spur gear 80. Slidably mounted in block 78 is a bearing 81 for a spindle 83, the spindle carrying a spur gear 84, meshing with and driven from gear 80, and a circular cutting blade 85. The lower part of the cutting edge of blade 85 projects into a slot 86 in an elongated shoe 88, which is narrowed at each end to form a nose to facilitate the passage of the shoe between the tuft loops 34 and the fabric 24, as illustrated in Figure 1. Shoe 88 is mounted on a plate 91 secured to the lower side of bearing 81, the shoe being positioned so as to rest on the fabric 24 as illustrated in Figure 2. Thus as the motor 50, gear housing 51, shoe 88, cutting blade 85, and other parts moving therewith, all of which may, for convenience, be termed the cutting device, are reciprocated on the guide means, which comprises the plates 36, the racks 60, and the cams 62, the shoe 88 traverses the fabric, passing under the tuft loops 34 in succession, which are thereupon severed by the rotating blade 85. As the cutting device approaches either side of the loom, the rollers 65 engage the adjacent cam 62, so that the entire cutting device is swung inwardly toward the loom, and the cutter is displaced rearwardly of the fabric 24 so as to follow a generally curved path, thereby compensating for the distortion of the fabric adjacent the selvage.

In order to compensate for irregularities and minor lack of alignment of adjacent tuft loops, the shoe 88 and cutting blade 85 are supported to permit slight endwise movement thereof. For this purpose the bearing 81, carrying spindle 83, shoe 88, and cutting blade 85 are mounted in block 78 for endwise sliding movement, as hereinbefore mentioned, being biased in the outward direction by a coil spring 89. Thus on slight misalignment of the tuft loops in a given row, the shoe 88, on passing under a misaligned loop, displaces the bearing 81, spindle 83, shoe 88, and cutting blade 85 against the action of spring 89, so that the cut may invariably be made in proximity to the center of the loop. Outward displacement of bearing 81 is adjustably limited by set screw 87.

A simple means and method of controlling the reciprocating movement of the cutting device on the guide means is represented diagrammatically in Figure 12 of the drawing. Thus motor 50 is of any conventional reversible type, energized from a supply line 93 through either of the conductors 94 and 95, for the purpose of rotating the motor in opposite direction, lead 96 being common to both circuits, and being directly connected to one side of the supply line. Conductors 94 and 95 are selectively connected with the other side of the supply line on energization of relays 98 and 99 respectively. One end of the winding of each of these relays is connected to the same side of the supply line; the other ends of the windings are connected to the other side of the supply line through a pair of single throw switches, switches A and B being connected in series with the winding of relay 98, and switches C and D being connected in a series with the winding of relay 99. The switches are normally biased to the positions in which they are shown in Figure 12, switches A and C being normally closed, and switches B and D being normally open.

Switch C may be mounted on bracket 41, carried by the loom frame at the left-hand side of the loom, as shown in Figures 1 and 3, and is provided with an operating arm 101 positioned for engagement by an abutment 102 on the gear housing 51, so that as the device reaches the limit of its movement to the left, the arm 101 is operated to open switch C, thereby de-energizing relay 99 and terminating displacement of the cutting device. Similarly, switch A may be mounted on the loom frame or other convenient member, near the right-hand end of the loom, and is provided with an operating arm 103, positioned for engagement by plate 66$^1$ carried by gear housing 51 as the cutting device reaches the limit of its movement toward the right, thereby de-energizing relay 98 and terminating operation of the motor.

Switches B and D are mounted on the loom frame above the dobby 21, switch B and its operating arm 105 being shown in Figure 3 of the drawing. The operating arm of each of switches B and D is positioned for engagement by a separate jack 17; the jacks selected for this purpose are a pair which are not being used for the manipulation of loom harness. Either of switches B and D may be operated at selected intervals by the insertion in the pattern chain of pins for controlling the operation of the jacks by which the switches are respectively operated.

Thus, referring again to Figure 12, if it be assumed that the cutting device is at the right-hand limit of its travel, so that limit switch A is open and limit switch C is closed, motor 50 may be energized to displace the cutting device to the left by closing switch D, to complete the motor circuit through conductor 95. As soon as the cutting device begins its movement to the left, limit switch A is allowed to close, and when the movement to the left is completed, switch C is opened by the cutting device to interrupt the current supply. The closing of switch B will now energize relay 98, and current will be supplied through conductor 94 to drive the motor in the reverse direction, the cutting device moving again to the right. While the cutting device occupies any position intermediate of the limits of its movement, starting and stopping, as well as control of direction of reciprocation, may be effected by closing either of the switches B and D in accordance with the setting of the pattern chain.

The preferred mode of operation hereinbefore described, whereby cutting of tuft loops adjacent either side of the fabric is always effected by displacement of the cutting device toward the selvage, is readily achieved. Thus if we assume that the cutting device occupies the extreme left position, designated position 1 in Figure 13 of the drawing, the motor 50 may be energized, through the feeding of the pattern chain, by the closing of switch B. When position 2 is reached, the motor is de-energized by releasing switch B. The pattern chain thereafter closes switch D to displace the cutting device to the left, the timing being such that tuft loops near the selvage have advanced to a position in which they may be engaged by the shoe 88 and severed by the cutting blade 80, and these loops are cut while the cutting device is moving toward the selvage. During this portion of the travel of the cutting device, the latter is concurrently displaced rearwardly of the pattern, as hereinbefore described, to compensate for distortion of the fabric. Strain applied to the fabric by the cutting operation on these loops is distributed over the major portion of the fabric and is not applied directly to the selvage, as would be the case if the cutting operation were initiated from position 1. When the cutting device again reaches position 1, switch A is opened to terminate the displacement. In accordance with the setting of the pattern chain, switch D is now opened and switch B is closed, and the cutting device moves across the entire fabric, cutting the remainder of the loops, displacement being terminated when position 3 is reached, by the opening of switch A. Switch B is then opened and switch D is closed, the cutting device moves to position 4, stopping with the opening of switch D. When the tuft loops of the next row are advanced to alignment with the shoe 88, switch B is closed, so that the cutting device moves from position 4 to position 3, and cuts the tuft loops adjacent the selvage. When position 3 is reached, switch C is opened, and the pattern chain opens switch B and closes switch D, whereupon the cutting device moves entirely across the fabric to the left, cutting the remainder of the loops in the row, displacement being terminated in position 1 by the opening of switch C. It will be perceived that the operation may be repeated indefinitely, the tuft loops being continuously and automatically severed as the fabric advances in the loom.

The mounting of the driving motor on the traveling cutting device affords a convenient method of rotating the cutting blade at a relatively high speed, and traversing the cutting device at a relatively low speed, from a common power source and with the least structural complication. It will be appreciated, however, that in its broader aspect the invention is not limited to this preferred embodiment, but envisions various other means and provisions for propelling the cutting device and manipulating the blade, such as would occur to those skilled in the field to which the invention relates. Similarly, other control systems, operable in timed relation to the rate of feed of the fabric, may be substituted for that illustrated and described herein.

Having thus described the invention, what is claimed as new and desired to be secured by Letters Patent is:

1. In the method of forming a tufted fabric by weaving into the fabric, at spaced intervals in the length thereof, a plurality of tuft cords extending lengthwise of the fabric, so as to provide tuft loops, the loops in adjacent cords being substantially aligned in rows transversely of the fabric, the step which comprises severing a row of tuft loops while the fabric is under lateral tension, by moving a cutting edge, in immediate succession, first from a point at one side of the fabric to sever the loops between said point and the selvage, thereafter across the width of the fabric to the opposite selvage to sever the remaining loops in the row, and then to a point inward of the last named selvage and inward of loops adjacent said last named selvage, and concurrently and during the severing of loops adjacent the selvages, displacing the cutting edge in the direction of distortion of the fabric caused by lateral tensioning of the fabric to compensate for such distortion.

2. In the method of forming a tufted fabric by weaving into the fabric, at spaced intervals in the length thereof, a plurality of tuft cords extending lengthwise of the fabric, so as to provide tuft loops, the loops in adjacent cords being substantially aligned in rows transversely of the fabric, the steps which comprise severing a row of tuft loops while the fabric is under lateral tension, by moving a cutting edge, in immediate succession, first from a point at one side of the fabric to sever the loops between such point and the selvage, thereafter across the width of the fabric to the opposite selvage to sever the remaining loops in the row, and then to a point inward of the last named selvage and inward of loops adjacent said last named selvage.

FRANK WILLIAM RIDDLE.

References Cited in the file of this patent

UNITED STATES PATENTS

| Number | Name | Date |
|---|---|---|
| 606,406 | Daymont | June 28, 1898 |
| 701,578 | Knowlton | June 3, 1902 |
| 1,103,838 | Rehfuss et al. | July 14, 1914 |
| 1,557,345 | Shumacher | Oct. 13, 1925 |
| 2,192,410 | Moore et al. | Mar. 5, 1940 |
| 2,598,578 | McCutchen et al. | May 27, 1952 |
| 2,598,579 | McCutchen et al. | May 27, 1952 |